US007577730B2

(12) United States Patent
Bae et al.

(10) Patent No.: US 7,577,730 B2
(45) Date of Patent: Aug. 18, 2009

(54) SEMI-HIERARCHICAL SYSTEM AND METHOD FOR ADMINISTRATION OF CLUSTERS OF COMPUTER RESOURCES

(75) Inventors: Myung Mun Bae, Pleasant Valley, NY (US); Jose E. Moreira, Yorktown Heights, NY (US); Ramendra Kumar Sahoo, Jefferson Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 10/307,103

(22) Filed: Nov. 27, 2002

(65) Prior Publication Data

US 2004/0103166 A1 May 27, 2004

(51) Int. Cl.
*G06F 15/173* (2006.01)
*G06F 15/16* (2006.01)
(52) U.S. Cl. ........................ 709/223; 709/208
(58) Field of Classification Search .......... 709/208, 709/221, 223, 226
See application file for complete search history.

(56) References Cited

U.S. PATENT DOCUMENTS 6,425,008 B1* 7/2002 Lecheler et al. ............. 709/224
2005/0198335 A1* 9/2005 Brown et al. ................ 709/229

* cited by examiner

*Primary Examiner*—Patrice Winder
*Assistant Examiner*—Tanim Hossain
(74) *Attorney, Agent, or Firm*—Douglas W. Cameron; Anne Vachon Dougherty

(57) ABSTRACT

A system and method for managing clustered computer resources, and more particularly very large scale clusters of computer resources by a semi-hierarchical n level, n+1 tier approach. The top level consists of the controller nodes. A first tier is defined at the top level. At a last level, at which the cluster of controlled nodes is found, a last tier is defined. Additional levels of controller or controlled nodes may exist between the top and bottom levels. At least one intermediate tier is introduced between two of the levels and comprises at least one proxy or a plurality of proxies. A proxy is a process or set of processes representing processes of the clustered computer resources. Proxies can run either on controller nodes or on the controlled nodes or controlled node clusters to facilitate administration of the controlled nodes.

12 Claims, 5 Drawing Sheets

SEMI-HIERARCHICAL SYSTEM AND METHOD FOR ADMINISTRATION OF CLUSTERS OF COMPUTER RESOURCES

FIELD OF THE INVENTION

The invention relates to the administration of a plurality of computer resources and more particularly to resource management and monitoring by distributed proxies.

BACKGROUND OF THE INVENTION

Very large scale computer resource cluster systems, particularly large scale cellular machines, introduce significant system management challenges. The ability to track and analyze every possible fault condition, whether it's a transient (soft) or permanent (hard) condition, in large cellular machines is a major issue from the points of view of systems software, hardware, and architecture. The difficulty is primarily due to the fact that the number of entities to be monitored is so large that interaction between the management system and the managed entities is overwhelmingly complex and expensive.

There are a number of available system management tools for clusters of computer resources. However, the existing technologies typically target small to medium size clusters. Typically a cluster resource management system consists of one or a plurality of centralized control workstations (CWSs) with all of the nodes reporting to the CWS being termed Client nodes (C-nodes). Small and medium size cluster management approaches cannot be directly applied to a system which is at least two orders of magnitude larger than the existing systems for the following reasons:

1. There is no clear road map or scalability feature addressed in the current systems to scale up to a very large cluster (e.g. 65536 nodes).

2. Most available tools are based on the popular operating systems (e.g., Linux, AIX, or Solaris) and applying them to specialized operating systems is an overwhelming task.

3. Many existing tools rely on a centralized control point, called a centralized control workstation (CWS), which both limits the size of the cluster and becomes a single point of failure for the cluster operation.

FIGS. 1 and 2 depict representative prior art hierarchical approaches to cluster management. A three-level cascading model is shown in FIG. 1 with two different levels of CWSs, specifically server node 101 over midlevel server nodes 110, 120 and 130, wherein midlevel server 110 manages client nodes 115, 117, and 119, midlevel server 120 manages client nodes 125, 127, and 129, and midlevel server 130 manages client nodes 135, 137, and 139. Alternatively, a very powerful centralized CWS can be provided to handle several thousands of C-nodes simultaneously. As illustrated in FIG. 2, centralized management server 201 directly manages the client nodes 210, 220, 230, 240, 250, and 260 in a standard two-level hierarchical system.

However, each of the foregoing approaches not only introduces more complexity and more resources, but also reduces the reliability and performance of the system significantly because of the load on the central server and the presence of many single points of failure.

Therefore, it is apparent that the current technologies may not be directly applied to very large clusters since they cannot be easily scaled up to manage large numbers of computers (e.g., 65536 nodes). Even with multiple CWSs, it would be necessary to introduce another level of management, which again introduces more complexity and at least on other single point of failure at the top management level.

It is therefore an objective of the present invention to provide a management system and method for clustered computer resources which is scalable to manage very large cluster.

It is another objective of the present invention to provide a management system and method for clustered computer resources which is flexible to react to fail-over conditions.

SUMMARY OF THE INVENTION

The foregoing and other objective are realized by the present invention which proposes a new system and method for managing clustered computer resources, and more particularly very large scale clusters of computer resources. The system and method provide a semi-hierarchical n level, n+1 tier approach. The top level consists of only controller nodes. A first tier is defined at the top level. At a bottom or last level, at which the cluster of controlled nodes is found, a last tier is defined. Additional levels of controller or controlled nodes may exist between the top and bottom levels. At least one intermediate tier is introduced between two of the levels and comprises at least one proxy or a plurality of proxies. A proxy is a process or set of processes representing processes of the clustered computer resources. Proxies can run either on controller nodes or on the controlled nodes or controlled node clusters and represent interfaces between controller and controlled nodes, facilitating the administration of a plurality of controlled nodes.

BRIEF DESCRIPTION OF THE DRAWINGS

The invention will now be described in greater detail with specific reference to the attached figures wherein.

DETAILED DESCRIPTION OF THE INVENTION

Figure 1:
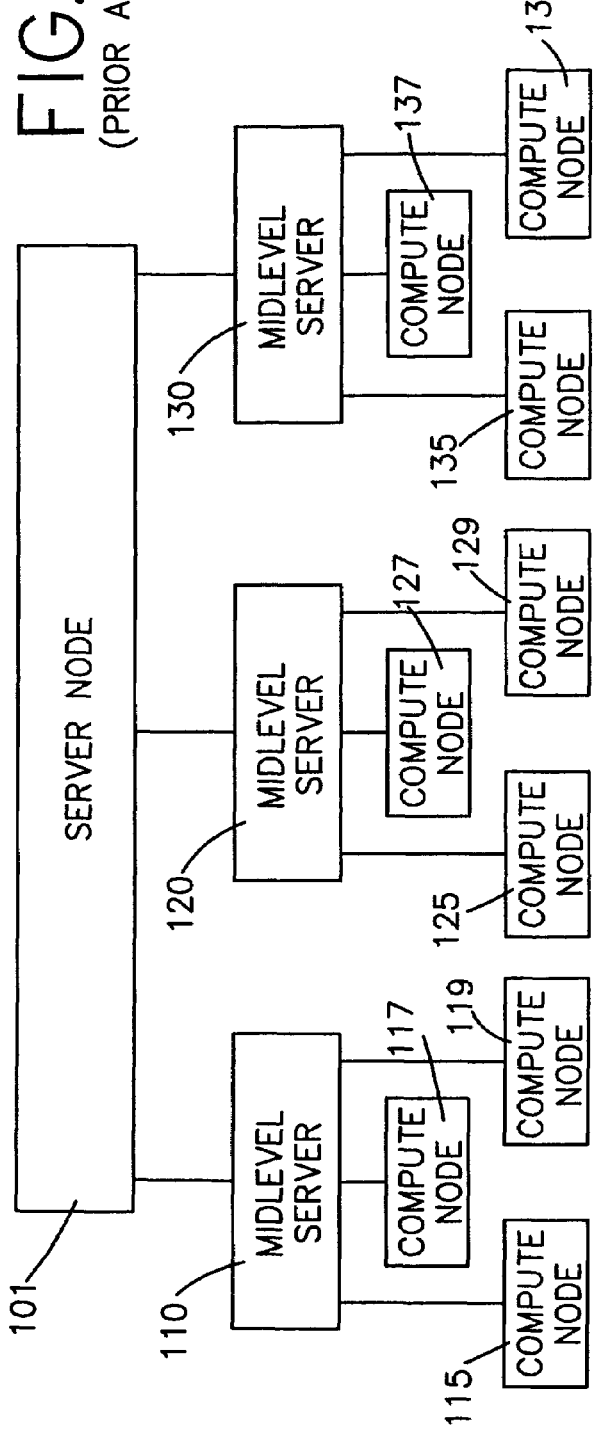
FIG. 1 illustrates a prior art multilevel hierarchical approach to the management of computer resources.
Figure 2:
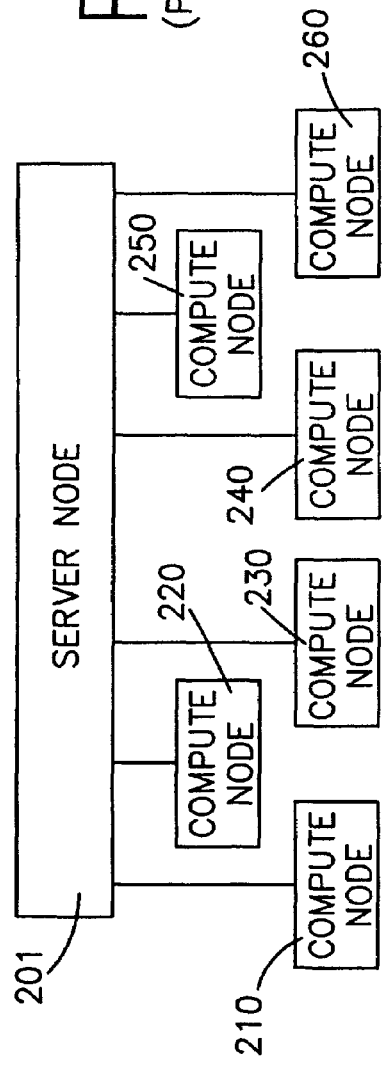
FIG. 2 illustrates a prior art two-level hierarchical approach to the management of computer resources.

The present system and method provide a semi-hierarchical n level, n+1 tier approach to the management of clusters of computer resources. The first or top level consists of the controller nodes, which are similar to CWSs in terms of functionality and purpose. A first tier is defined at the top level. At a last level, at which the cluster of controlled nodes is found, a last tier is defined. Additional levels of controller or controlled nodes may exist between the top and bottom levels. At least one intermediate tier is introduced between two of the levels and comprises at least one proxy or a plurality of proxies.

For purposes of the ensuing description, the following terms are defined:

"Controller" nodes or controller resources represent those entities which have control or management functionality within a cluster system. The term "controller" encompasses the more restrictive terms "service node" and "server".

"Controlled" nodes or controlled resources represent those entities which are required to be managed within a cluster system. The term "controlled" encompasses the more restrictive terms of "compute node" and "client".

A "proxy" is a process or a set of processes, running either on one or more controlled nodes or controller nodes (e.g., CWSs), which represents the processes of clustered controlled nodes/computer resources collectively and which acts as a conduit between the controlled processes at the last or bottom level and controller computer resources at a first or top level. The flexibility of a proxy running either on controller or controlled nodes makes a semi-hierarchical system customizable and provides greater management availability with improved fail-over recovery.

A "proxy resource manager" (PxRM) is a management entity which can run on one or more controller nodes. True resource information can be gathered and propagated through the proxy-running nodes, with filtering provided by the PxRMs so that only critical information is conveyed to the controller nodes which provide services. Proxy resource managers can, if necessary, be transparently moved from one node to another node without reporting false information about the resources.

The term "level" is used to classify various components which are arranged to differentiate between entities and to manage entities within a very large cluster using the inventive semi-hierarchical approach. The term "level" accommodates more or less similar types of computers or processing units which have similar functionality. For example, compute nodes which just concentrate on intensive computations, irrespective of the type of computing, would fall into the same level of controlled nodes or resources. Service nodes whose main purpose is to provide support services can be branded under a totally separate level of controller nodes or resources. Based on the functionality, if the computers are of the same or similar types, with some of them having additional features, they would still belong to the same level, but would be classified into different tiers as further discussed below. Another way of differentiating computer resources into different levels is from a networking and/or a communication point of view. A list of computers would fall into the same level provided that they have same type of networking features and provided that there is no difference in communication bandwidth between two different computers of the same level. For example, in case of BG/L service nodes, there are two different types of service nodes based on the administrative role and the control role. However, because all of the service nodes have the same type of networking or communication features, all of the service nodes would fall under the same "level" type. Further the I/O nodes and the compute nodes, in case of BG/L, would also come under a common "level" category.

A "tier" is a logical grouping of nodes within or across levels. Computers in the same tier must be of the same type; and, software and hardware contents of one node in a tier should have the same functionality as contents of another node in the same tier. From a system management perspective, computer nodes in the same tier should look the same and perform the same work in case there is a fail-over.

The preferred way to address a very large number of resource components is to redefine the component level nodes, as detailed above, so that each of the resource management subsystems can have a number of hardware and/or software entities, treated as either attached devices (in the case of hardware) or as proxies (for software or system based tools). The foregoing enables any "bring up" and "bring down" of the compute nodes as an attached device bring-up or bring down recorded through device level support. Hence there is no need for a different hardware-based "heartbeat" monitoring mechanism to monitor each and every compute node.

A set of controlled nodes in a cellular cluster system is managed through a proxy process that runs either on another node belonging to same level (e.g., an I/O node or another node of same type), on a controller node which is on a different level, or on both. The controlled nodes are considered as controllable external entities (e.g., devices) attached to the proxy process running either on another same level node or a different level node.

The proxy present either for the controlled node level or the controller node level basically handles, and effectively cuts down, the midlevel server node functionalities which were illustrated at 110, 120 and 130 of FIG. 1. Depending upon the requirements of the cluster, the proxies can be customized to be present in either or both levels. Important results of using proxies include the fact that, to the outside world, a very large cluster is represented by means of the proxies for the controlled nodes. Thus, there is no requirement for individual controlled node control, hence a 100,000 node cluster can be easily viewed as a 1000 node proxy cluster. Further, failovers can be easily addressed through the proxies. The controller nodes will be coordinated, so that controlled nodes can be failed over to another controller node in case of a failure to provide the stipulated services to the corresponding set of controlled nodes.

In this way, a set of controlled nodes are simply represented through a process and, thus, the number of nodes to manage is significantly reduced. The inventive system and method, therefore, does not require one or multiple CWSs. The management is non-intrusive to the applications running on the controlled nodes; and, from a management perspective, only the controller nodes and the nodes running proxies are visible, resulting in a system which can be effectively seen as much smaller than it is. The controller nodes can be self-managed, along with the controlled node automatic failover feature, without a centralized control workstation.

In the case of the controller nodes, a set of nodes and/or the nodes from the controlled node level with proxies, which may be I/O nodes, talk to the core controlled nodes in a large scale cluster. In this view, the size of the top level cluster will be effectively smaller than the total number of bottom level nodes. The nodes with proxies are distributed peers rather than hierarchical controlling nodes. The reason that the system is referred to as "semi-hierarchical" is because an n+1 tier functionality is being provided through an n level system, as further detailed below with reference to FIGS. 3A, 3B, 4 and 5.

Figure 3A:
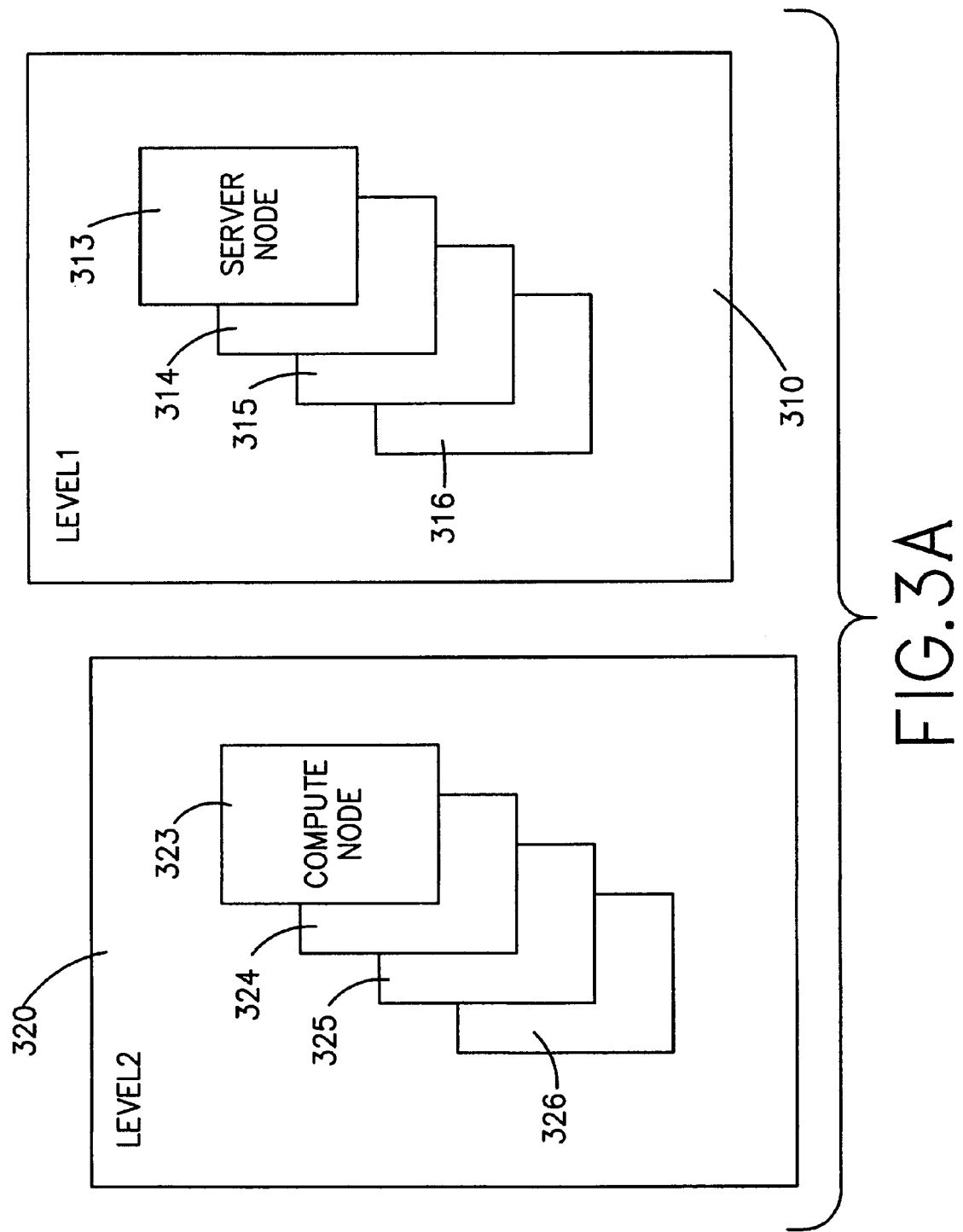
FIGS. 3A and 3B provide illustration of a two level system in which the present invention is implemented.
Figure 3B:
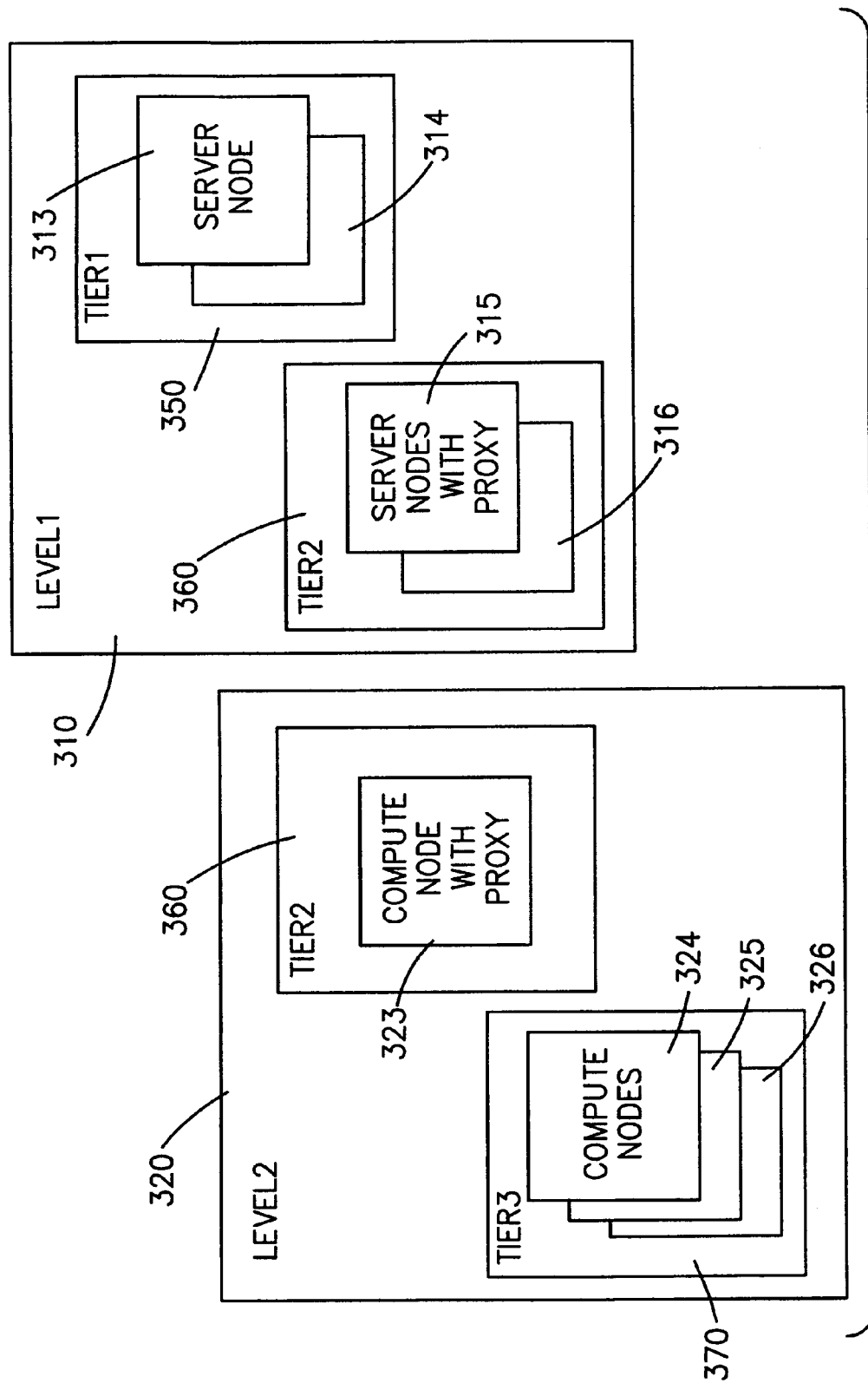

In a first detailed embodiment of the invention, as illustrated in FIGS. 3A and 3B, there are two levels, with each level having a plurality of computers performing similar functionality. The two levels are the controlled level and the controller level. In the system illustrated in FIG. 3A, four controller nodes, 313-316, reside in level 1, 310, and four controlled nodes, 323-326, reside in level 2, 320. By the present invention, as illustrated in FIG. 3B, the controller nodes are partitioned into Tier 1, 350, comprising nodes with administrative authority, namely controller nodes 313 and 314, and Tier 2, 360, comprising controller nodes 315 and 316 which are responsible for cluster management and have the inventive proxy functionality. As illustrated, Tier 2, 360, also encompasses controlled node 323 having the inventive proxy functionality and being associated with the plurality of controlled nodes 324-326. Controlled nodes 324-326 are logically partitioned into Tier 3, 370.

Therefore, the FIG. 3A system is logically partitioned into three tiers of computer nodes, each tier being a portion of at least one of the levels, with each tier performing at least one of the controlled or controller functions. Tier 1 consists of purely management nodes and is a controller level. Tier 3 consists of purely managed nodes and is a controlled level. Tier 2, the intermediate tier, consists of nodes which have the flexibility to overlap the activities from both controlled and controller levels. While an even partitioning of controller nodes is illustrated, it may be preferable to partition a smaller set of controller resources to the intermediate tier. The semi-hierarchical approach makes it possible to avoid the introduction of more than two levels of hierarchy (used conventionally to manage systems), because of the flexible intermediate level.

In operation, events from the Tier 3 controlled nodes, 324-326, are monitored by the Tier 2 controlled node with proxy, 323, and can be filtered prior to being communicated to the Tier 2 controller nodes with proxies, 315 and 316. As noted above, proxies can run on one or both of controller and controlled nodes, with filtering provided at one or both proxies. With each proxy running on Tier 2, treating Tier 3 computers or nodes as attached devices or controllable units, the system management and control process as a whole are simplified. Should so-called "heartbeat" information still be required, an additional supervisory component (not shown) can monitor events at the Tier 3 controlled nodes for statistical purposes and then forward the events to the Tier 2 controller node for filtering. In either case, events will flow through the proxy nodes prior to being selectively provided to the Tier 1 controller nodes. Control or management actions in the illustrated system can be sent directly from the Tier 1 controller nodes to the Tier 3 controlled nodes or can, preferably, be sent from the Tier 2 controller nodes to the Tier 3 controlled nodes. This minimizes the apparent size of the managed cluster from the viewpoint of the Tier 1 controller nodes.

Figure 4:
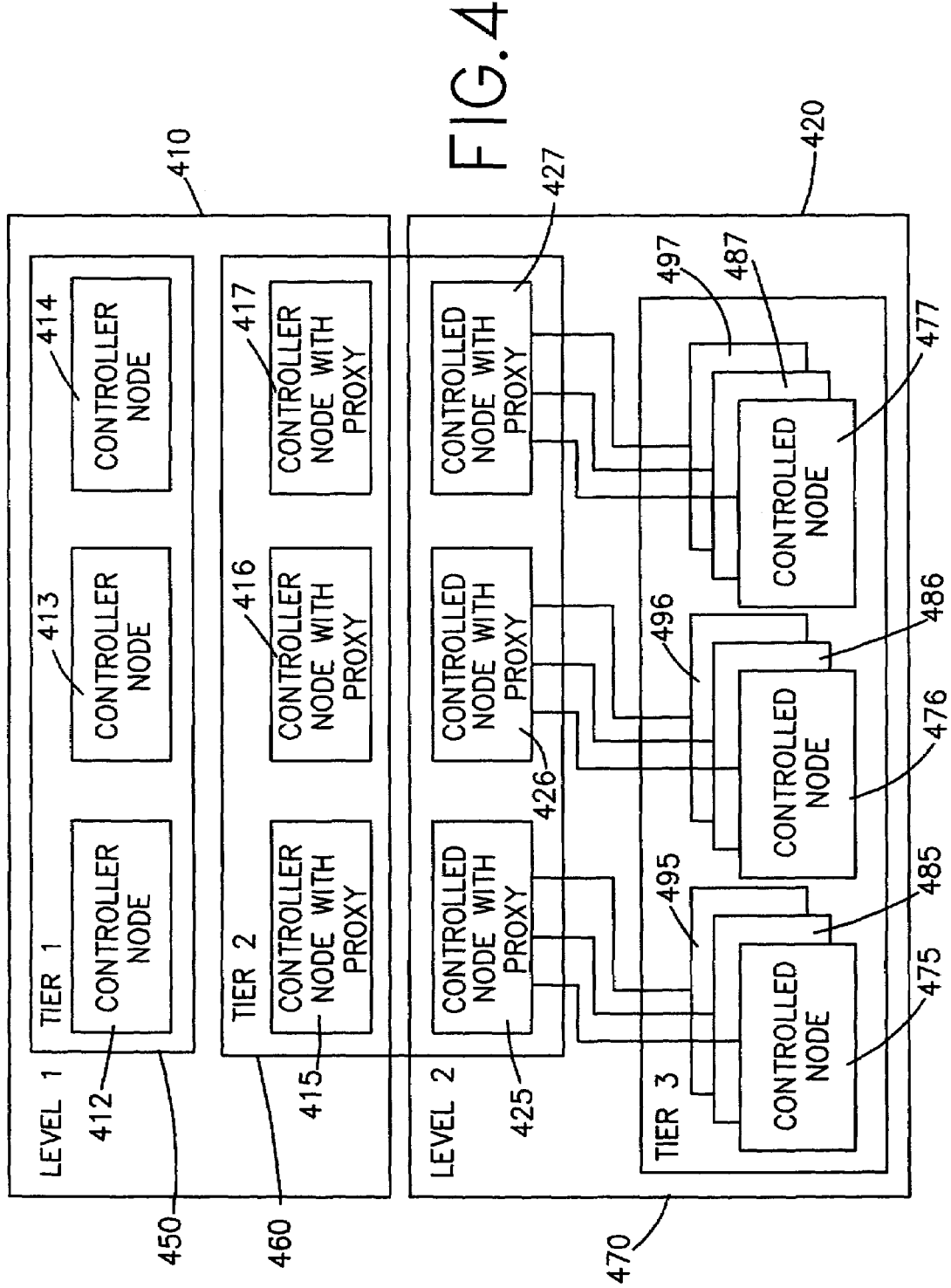
FIG. 4 provides a logical diagram of a two-level, three-tier semi-hierarchical management system in accordance with the present invention.

FIG. 4 provides an alternative illustration of a two level, three tier embodiment of the present invention. The two level system includes controller level 410 and controlled level 420. The controller nodes, 412-417, are logically partitioned between two tiers, with controller nodes 412, 413, and 414 being partitioned into Tier 1, 450, to perform purely administrative functions. Controller nodes 415, 416, and 417 are partitioned into Tier 2, 460, and are provided with controller side proxies to perform direct management and event filtering for the controlled nodes of the system. The controlled nodes are logically partitioned into controlled nodes having proxies, nodes 425, 426 and 427, which are found in intermediate Tier 2, 460, and controlled nodes 475-477, 485-487, and 495-497 which are found in Tier 3, 470. Each of the Tier 2 controlled nodes with proxies is associated with a cluster of Tier 3 controlled nodes. Controlled nodes 475, 485 and 495 are associated with, and provide event information to, a Tier 2 controlled node with proxy, node 425. Similarly, controlled nodes 476, 486 and 496 are associated with, and provide event information to, a Tier 2 controlled node with proxy, node 426. Further, controlled nodes 477, 487 and 497 are associated with, and provide event information to, a Tier 2 controlled node with proxy, node 427. As detailed above, the Tier 2 proxies act as interfaces between the Tier 3 controlled nodes and the Tier 1 controller nodes, gathering event information, filtering the gathered event information, and providing filtered event information to the controller nodes. Management actions from the controller nodes are preferably directed through the Tier 2 nodes with proxies with the result being minimization of the apparent size of the cluster of managed resources.

Figure 5:
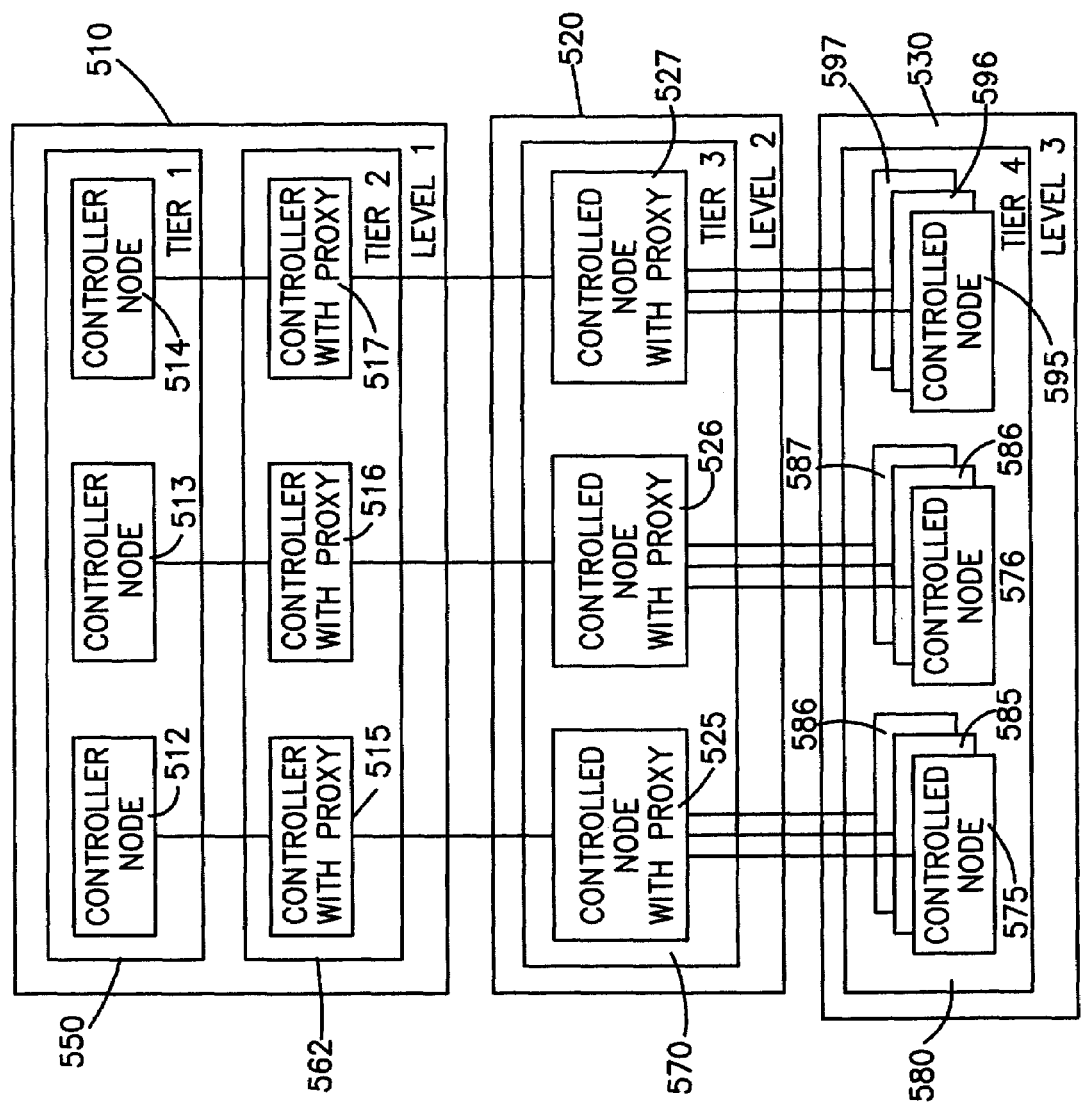
FIG. 5 provides a logical diagram of an n level, n+1 tier semi-hierarchical management system in accordance with the present invention.

By virtue of the illustrated system, a very large cluster system (~100 s of thousands of computers) can be viewed as a manageable unit of clusters (e.g., roughly on the order of 1000 multicomputers) through the introduction of proxies. FIG. 5 illustrates another implementation of the invention in an n level with n+1 tier arrangement. As illustrated in FIG. 5, four tiers, 550, 560, 570, and 580, are provided for three levels, 510, 520 and 530. Level 1, 510, as well as Tier 1, 550, is comprised of cluster controller nodes which perform purely administrative management functions. Level 2, 520, includes controller nodes with proxies, 515, 516, 517, which are logically partitioned into Tier 2, 560. Level 2, 520, controlled nodes with proxies, 525, 526, and 527, are logically partitioned into Tier 3, 570, and are associated with the Level 3, 530, Tier 4, 580, controlled nodes. More specifically, Tier 4 controlled nodes 575, 585, and 595 are associated with and provide event information to controlled node with proxy 525. Tier 4 controlled nodes 576, 586, and 596 are associated with and provide event information to controlled node with proxy 526. Tier 4 controlled nodes 577, 587, and 597 are associated with and provide event information to controlled node with proxy 527. For statistical analysis of data, isolation of failures, and prediction of future problems, the controller nodes with proxies will filter the unnecessary events and collect only the essential or severe events to be provided to the central data repository on one of the Tier 1 controller nodes. Predictive analysis will then be performed at the Tier 1 controller node or nodes and actions taken as necessary.

A similar more complex n level, n+1 tier organization of the nodes for cluster system management can be formulated depending upon the proxy arrangement, policy decisions (e.g., what information is deemed critical information that must be forwarded to the controller nodes and what information can be filtered, stored, and/or discarded), and other node hardware and software requirements, as will be apparent to those having skill in the art.

The inventive system can comprise the following components, along with the hardware tools already present in a cluster environment and along with the above-described proxy software, for a large scale system management and control process: an optional GUI interface running at the top level (e.g., WebSM) controller node with administrative authority; cluster system management coordination between management nodes (in this case controller nodes with administrative authority) and other controller nodes (e.g., CSM); predictive failure analysis running on one or more controller nodes, including fault isolation tools; and, as a specific case, rack-based supervisors running hardware-software interfaces (e.g., translating the transient or permanent hardware errors to text based event logs in expanded and short form).

The invention has been detailed with reference to several preferred embodiments. It will be apparent to one skilled in the art that modifications can be made without departing from the spirit and scope of the invention as set forth in the appended claims.

What is claimed is:

1. A customizable system for providing management of scalable clusters of computer resources comprising:
   at least one first level of controller computer resources;
   at least one second level of controlled computer resources, wherein said at least one first and said at least one second levels are different hardware levels; and
   at least one tier comprising a logical grouping of nodes from more than one of said hardware levels and comprising at least one proxy set of processes representing the processes of clustered controller and controlled computer resources at the different hardware levels and acting as an interface between said controller and said controlled computer resources;

wherein at least one proxy resource manager runs on at least one controller computer resource and can move to another controller computer resource.

2. The system of claim 1 wherein said at least one proxy is provided in at least one of controller and controlled computer resources.

3. The system of claim 1 wherein said at least one proxy comprises at least one component for gathering event information from said controlled resources and for providing event information to said at least one proxy manager.

4. The system of claim 3 wherein said at least one proxy additionally comprises at least one component for filtering said event information prior to providing filtered event information to said at least one proxy manager.

5. A system for providing management of scalable clusters of computer nodes, including controlled and controller nodes, comprising:
   a first tier of computer resources comprising a plurality of said controller nodes;
   a last tier of computer resources comprising a plurality of said controlled nodes, wherein said first tier and said last tier are different hardware levels from each other; and
   an intermediate tier comprising a logical grouping of nodes from said first and last tier and having at least one proxy set of processes representing the processes of clustered controller and controlled computer resources and acting as an interface between said controller and said controlled computer resources;
   wherein at least one proxy resource manager runs on at least one controller node and can move to another controller node.

6. The system of claim 5 wherein said at least one node having a proxy includes at least one of a controller node and a controlled node.

7. A system for providing management of scalable clusters of computer resources, including controlled and controller resources, comprising:
   n different hardware levels of computer resources wherein a first level comprises controller resources and a last level comprises at least one cluster of controlled resources;
   and n+1 logical tiers wherein a first tier comprises said first level, a last tier comprises said last level, and an intermediate tier comprising resources from more than one hardware level of resources and comprises at least one resource having a proxy comprising at least one process for representing cluster resources;
   wherein at least one proxy resource manager runs on at least one controller resource and can move to another controller resource.

8. The system of claim 7 wherein said proxy can run on at least one of a controller resource and a controlled resource.

9. The system of claim 7 wherein said at least one proxy comprises at least one component for gathering event information from said controlled resources at said last level and for providing event information to said at least one proxy manager.

10. The system of claim 9 wherein said at least one proxy additionally comprises at least one component for filtering said event information prior to providing filtered event information to said at least one proxy manager.

11. A method for providing management of a system of computer resources, wherein said computer resources comprise at least controller resources and controlled resources, comprising the steps of:
   providing a first tier having at least one controller resource for providing management functions;
   providing a last tier having a plurality of controlled resources, wherein said first tier and said last tier are different hardware levels from each other; and
   providing an intermediate tier comprising a logical grouping of nodes from more than one tier and from more than one hardware level and comprising at least one proxy set of processes representing the processes of clustered controller and controlled computer resources and acting as an interface between said controller and said controlled computer resources;
   wherein at least one proxy resource manager runs on at least one controller resource and can move to another controller resource.

12. The method of claim 11 wherein said resources are disposed in multiple levels comprising at least one level of controller resources and at least one level of controlled resources and wherein said providing an intermediate tier comprises defining said tier at resources in at least one of said levels.

* * * * *